United States Patent [19]

Ausnit

[11] Patent Number: 4,629,524
[45] Date of Patent: Dec. 16, 1986

[54] MAKING RECLOSABLE BAG MATERIAL

[75] Inventor: Steven Ausnit, New York, N.Y.

[73] Assignee: Minigrip Incorporated, Orangeburg, N.Y.

[21] Appl. No.: 724,170

[22] Filed: Apr. 17, 1985

[51] Int. Cl.[4] .............................................. B32B 31/20
[52] U.S. Cl. ................................ 156/66; 156/244.11;
156/244.27; 156/498; 156/499; 156/500;
493/215
[58] Field of Search ................ 156/66, 244.11, 244.27,
156/498, 500, 499; 150/3; 493/215

[56] References Cited

U.S. PATENT DOCUMENTS

| Re. 29,331 | 8/1977  | Naito ....................................... 138/118 |
|------------|---------|-------------------------------------------------------|
| 3,500,727  | 3/1970  | Behr et al. ................................. 93/20   |
| 3,503,112  | 3/1970  | Siegel ..................................... 29/202.5  |
| 3,532,571  | 10/1970 | Ausnit ..................................... 156/91   |
| 3,787,269  | 1/1974  | Noguchi ................................... 156/500   |
| 3,932,257  | 1/1976  | Noguchi ................................... 156/500   |
| 3,945,403  | 3/1976  | Noguchi ................................... 138/118   |
| 3,948,705  | 4/1976  | Ausnit ..................................... 156/73.4 |
| 4,101,355  | 7/1978  | Ausnit ..................................... 156/66   |
| 4,249,982  | 2/1981  | Ausnit ..................................... 156/461  |
| 4,259,133  | 3/1981  | Yagi ....................................... 156/244.11|
| 4,279,677  | 7/1981  | Takahashi ............................... 156/744.11  |
| 4,290,467  | 9/1981  | Schmidt ................................... 150/3     |
| 4,306,924  | 12/1981 | Kamp ....................................... 156/244.11|
| 4,341,575  | 4/1982  | Herz ....................................... 156/66   |
| 4,372,793  | 2/1983  | Herz ....................................... 156/66   |
| 4,430,070  | 2/1984  | Ausnit ..................................... 493/215  |
| 4,563,319  | 1/1986  | Ausnit et al. .......................... 156/66      |

*Primary Examiner*—Caleb Weston
*Attorney, Agent, or Firm*—Hill, Van Santen, Steadman & Simpson

[57] ABSTRACT

Method and apparatus for making reclosable bag material and wherein a continuous length of preformed, flat bag wall web of multibag width is continuously run along flat stationary supporting surface. A plurality of continuous length fastener profile strips are joined into corunning assembled relation with the web on the surface. The strips are guided to retain their longitudinal running positions on the web. Bonding fusion energy is applied by way of openings in the surface and through the web toward the base surface of each of the fastener strips.

20 Claims, 5 Drawing Figures

U.S. Patent  Dec. 16, 1986  4,629,524
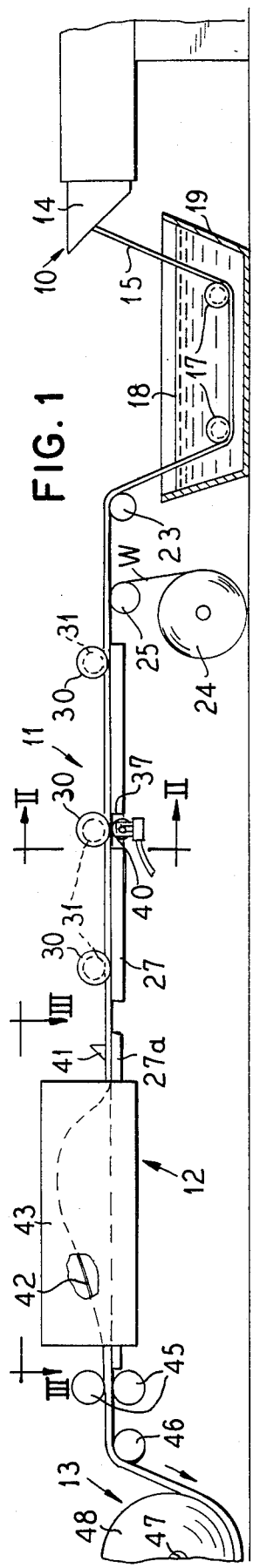
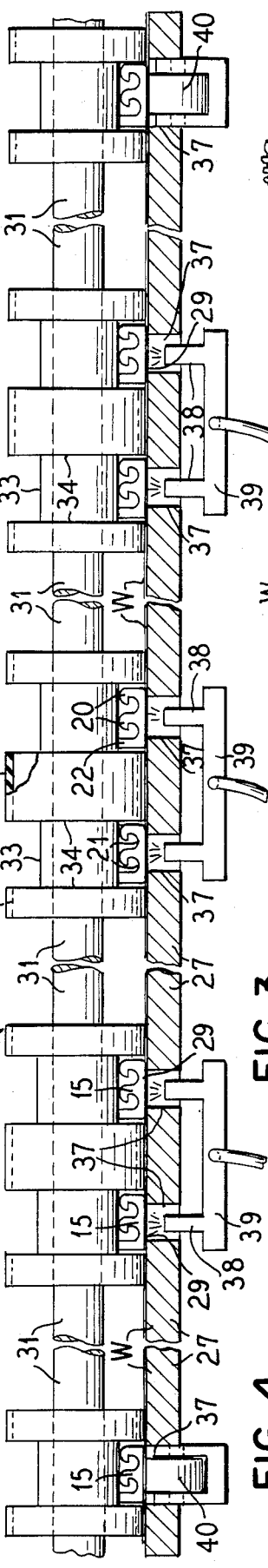
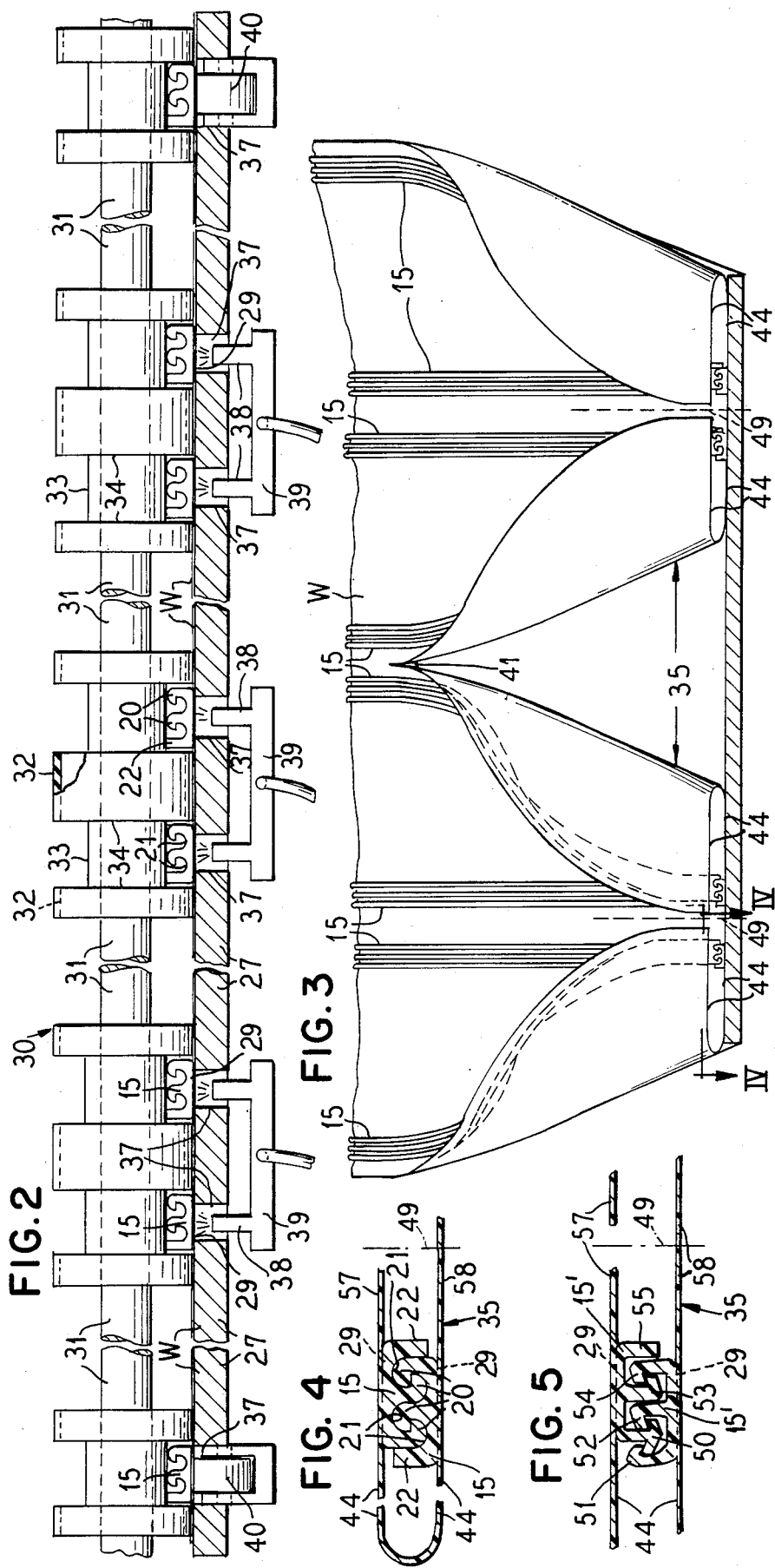
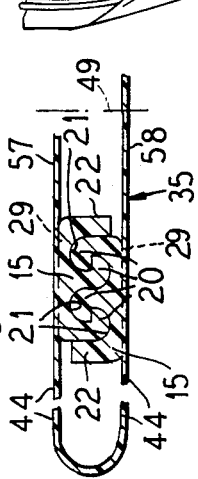
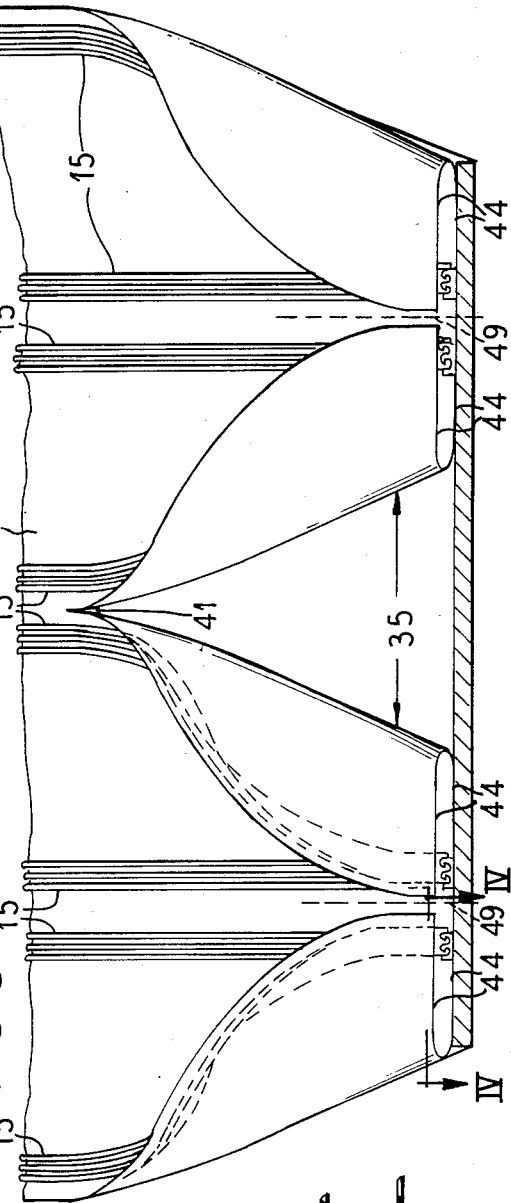
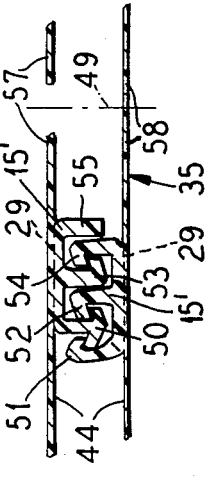

MAKING RECLOSABLE BAG MATERIAL

This invention relates to a method of and means for making reclosable bag material, and is more particularly concerned with high speed joining of prefabricated bag wall web of multibag width with profile fastener strips for providing reclosable closure means for the bags to be ultimately fabricated from the assembly.

Mass production of material for making reclosable bags is now a fairly well developed art. However, there is a constant striving to produce the bag making material at lower cost, much to the advantage of the ultimate consumer.

In order to overcome the relatively slow production rate for bag material in which the web and fastener profiles are integrally extruded from the same material, particularily where a variety of sizes have to be made from the same set up, various proposals have heretofore been made for separately extruding or otherwise forming the bag wall web and the separable and reclosable fastener strips and then joining the fastener strips and the web.

Where the web and fastener strips are integrally extruded, there is the problem of mass differential between the web and the fastener profiles which slows the extrusion rate to the rate at which the profiles can be extruded and rendered self-sustaining after extrusion. On the other hand, where the web is separately formed, that can generally be accomplished at a much higher production rate than the production rate for the fastener profiles. Further, by separately forming the web and the fastener profile strips, diverse materials may be employed in the different parts of the assembly.

Representative examples of the prior art relevant to the field of the present invention are referred to as follows:

U.S. Pat. No. 3,948,705 discloses heat sealing flanges of plastic fastener strips to the margins of plastic web.

U.S. Pat. No. 4,101,355 also discloses attaching the side flanges of fastener strips to the bag wall web, and in this instance either by electronic fusion or by adhesive applied at the joining of the fastener strips with the web.

U.S. Pat. No. 4,341,575 discloses securing fastener strips of the flanged type to the bag making web by means of adhesive applied at the joining of the assembly.

It is an important object of the present invention to provide a new and improved method of and means for making reclosable bag material from separately formed bag wall web and reclosable fastener strips, and more particularly to do so at high speed production rate and in multibag widths.

To this end the invention provides a method of making reclosable bag material, comprising continuously running a continuous length of preformed flat bag wall web of multibag width along flat stationary supporting surface means, joining into corunning assembled relation with the web on the surface means a plurality of continuous length spaced parallel preformed extruded resiliently flexible fastener profile strips, and in the assembly engaging base surfaces on said strips in face-to-face relation with the web, guiding the strips to retain their longitudinal running positions on the web, and applying bonding fusion energy by way of opening means in said surface means and through said web toward the base surface of each of said strips.

The invention also provides new and improved apparatus for practicing the method just described.

Other objects, features and advantages of the invention will be readily apparent from the following description of certain representative embodiments thereof, taken in conjunction with the accompanying drawing although variations and modifications may be effected without departing from the spirit and scope of the novel concepts embodied in the disclosure and in which:

FIG. 1 is a schematic side elevational view of a continuous production line for making reclosable bag material pursuant to the present invention;

FIG. 2 is an enlarged fragmental vertical sectional detail view taken substantially along the line II—II in FIG. 1;

FIG. 3 is an enlarged fragmentary top plan view taken substantially along the line III—III in FIG. 1;

FIG. 4 is an enlarged fragmental sectional detail view taken substantially along the line IV—IV in FIG. 3; and FIG. 5 is a view similar to FIG. 4 but showing a modified construction of the complementary separable and reclosable fastener profiles.

In FIG. 1 the schematically illustrated high speed production line includes a fastener profile strip extruding station 10, followed by a bag material assembly and bonding station 11, which in turn is followed by a dividing and folding processing station 12, from which the assembly preferably goes to a winding station 13.

In the extruding station 10, an extruder 14, which is equipped with a multi-orifice die, extrudes simultaneously suitable thermoplastic material into as many separable fastener profile strips 15 as may be desired. Multi-orifice profile strip extruders are known in the art, and merely by way of example U.S. Pat. No. 4,259,133 is referred to. The material for the extruded fastener profile strips 15 may be selected for the intended purpose, polyethylene and polypropylene being referred to by way of example.

As reasonably promptly after extrusion, the fastener strips 15 are chilled so that their profiles will retain their extruded shape. For example, the freshly extruded strips 15 may be guided by guide rollers 17 to run through a body of chilling liquid 18 contained in a chilling tank 19. This sets the thermoplastic material so that from there on the fastener strips 15 may be handled without deformation or distortion of the profiles. As best seen in FIGS. 2 and 4 the profiles may comprise profile ribs 20 of generally hook-shaped cross-section having complementary grooves 21 therealong and in part defined along one edge of each strip by means of a stabilizing flange 22. Thereby, as seen in FIG. 4 the profiles of any of the fastener strips 15 are adapted to releasably interengage, that is interlock, with the profiles of any other strip by virtue of the complementary structure and the resiliently flexible nature of the profiles 20 and the stabilizer flanges 22.

From the chilling tank 19, the profile fastener strips 15 are guided by roller means 23 toward joining into corunning assembled relation with a bag wall web W which may be fed from a supply roll 24 and guided by roller means 25 to joining with the fastener strips 15 in substantially the plane of a flat stationary supporting surface means comprising a table 27 having a surface 28 on which the web runs continuously lengthwise.

Base surfaces 29 on the fastener strips 15 are caused to engage in face-to-face relation with the web W. As thus engaged with the web W, the fastener strips 15 are guided as by means of grooved rollers 30 to retain the longitudinal running positions of the fastener strips on the web W. In a preferred arrangement, the rollers 30 are located at respectively the upstream and downstream end portions of the table 27 and at an intermediate portion of the table, substantially as shown in FIG. 1. Each of the rollers 30 may comprise a single solid unit, or it may comprise a plurality of coaxial sections carried on a rotary shaft 31 which may be an idle shaft or a driven shaft as may be preferred. Each of the rollers 30 may be formed from relatively soft cushioning material having suitable durometer or may have a cushioned friction cover 32 on the perimeter of a hard core for each section for gripping the multibag width web W.

For guiding the fastener strips 15 each of the rollers 30 has respective annular grooves 33 which are so dimensioned that their root surfaces engage and lightly bias the fastener strips 15 toward the web W so as to maintain a positive face-to-face engaged relation between the base surfaces of the fastener strips and the subjacent longitudinal area of the web. Sidewalls 34 defining the grooves 33 are spaced apart to about the width of the fastener strips 15 but slightly wider to afford free movement of the fastener strips through the roller grooves. An advantage of having the rollers 30 in sections along the respective shafts 31 is that thereby the roller sections are adapted to be adjusted axially along the associated shafts for varying the spacings of the fastener strips 15 along the web W for different sizes of bags. In the arrangement exemplified in FIG. 2, the rollers 30 have sufficient grooves for guided fastener strips 15 for making two double bag ribbons 35 as exemplified in FIG. 3. In this arrangement, there is a respective fastener strip 15 longitudinally along each longitudinal margin of the web W, and three pairs of parallel adjacently spaced fastener strips appropriately spaced on the web between the marginal strips.

As the web and fastener strip assembly travels along the table 25, bonding fusion energy is applied for permanently securing the fastener strips to the web. To this end, the web W may be a thermoplastic material such as polyethylene, and the fastener strips 15 may be polyethylene or any suitable plastic material which is compatible for direct fusion attachment to the web. On the other hand, where the web and/or the fastener strips are not directly fusedly bondable, the base surfaces 29 of the fastener strips 15 may be supplied with a heat reactivatable adhesive which may be applied to the base surfaces in the course of extrusion or thereafter, employing known techniques. Then, by reactivating the adhesive, bonding of the fastener strips to the web can be effected. In any event, the fusion bonding (whether direct fusion bonding or reactivatable adhesive fusion bonding) may be effected, substantially as shown in FIGS. 1 and 2, by applying bonding fusion energy by way of opening means 37 in the table 27 and preferably comprising individual openings aligned with each of the fastener strips 15 and intermediate each of the applicable rollers 30. Each of the openings 37 is of a width preferably about the same as, but no wider than, the width of the aligned fastener strip 15, and centered with respect to the fastener strip.

The bonding fusion energy may be supplied in any preferred manner suitable for the purpose, such as by means of hot air nozzles 38 supplied from a suitable source through one or more manifolds 39. As shown, the hot air nozzles 38 are provided for supplying fusion energy through the openings 37 to the three pairs of adjacently spaced fastener strips 15, while a different means for applying bonding fusion energy may be provided at the openings 37 aligned with the fastener strips 15 which are adjacent to the longitudinal margins of the web W. For example the latter bonding fusion energy supplying means may comprise respective electronic devices such as rolls 40, as suggested in the aforesaid U.S. Pat. No. 4,101,355. On the other hand the electronic bonding fusion energy devices may comprise horns as suggested in the aforesaid U.S. Pat. No. 3,948,705. It will be appreciated, of course, that the hot air applicators 38 and the electronic fusion energy applicators 40 are merely exemplary. Bonding fusion energy may be supplied to all of the web/fastener strip locations by either or any combination of these or other bonding fusion energy applying means.

As the bonding fusion energy is applied through the web W to the base surfaces 29 of the strips 15 for bonding the web to the fastener strips, the web may be maintained taut by the rollers 30, and more particularly those portions of the rollers at each side of each of the clearance openings 37. In addition, the cushioning, frictional, preferably heat resistant synthetic rubber peripheral covers 32 on the rollers 30 may serve as insulators against lateral spreading of fusion energy heat from the areas of the web being bonded to the fastener strips. If preferred, the rollers 30 or cores thereof themselves may be made from a poor heat conducting material such as bakelite. Thereby possibly web deteriorating spreading of heat laterally from the specific areas of the web being bonded to the fastener strip is avoided. Further protection against lateral spreading of bonding heat may be effected by forming the table 27 from a poor heat conductor such as bakelite or any other material having at least equivalent heat insulating value. If preferred, of course, the table 27 may be formed from stainless steel which is known to have low heat transfer property. If desired, the table 27 may serve as a heat sink or may otherwise provide for substantially insulating the web against overheating laterally from the areas thereof being fused to the fastener strips.

Not only do the roller sections aligned with the bonding fusion energy means maintain a firm contact between the fastener strips 15 and the web W during the fusion energy application, but assure that as the fastener strip and web combination moves downstream along the table 27, the fusion contact will be maintained. Then, as the fastener strip and web combination moves under the final rotating roll 30, a final squeezing may be imparted to the fastener strips 15 toward the web backed up by the table 27.

The completely fused bonded fastener and web assembly as it travels downstream from the bonding station 11, enters the processing station 12 where the assembly is divided from a flat monolythic unit into the double bag ribbons 35. To this end, the web W is separated as by means of a slitter 41 medially longitudinally between the, in this instance, adjacently spaced center fastener strips 15, and travels onward over a table 27a which may be separate from or an extension of the table 27.

Immediately downstream from the slitter 41, the two separated longitudinal portions of the fastener strip and web assembly are folded from opposite sides onto themselves as by means of a folding plow mechanism 42 within a housing 43. Thereby, the folds provide for bag side walls 44, and the fastener strips 15 along the opposite margins of the separated portions of the assembly are brought into registration with the relatively closely spaced center fastener strips on the ribbon portions 35 to provide reclosable top closures for bags into which the ribbons 35 may be subsequently divided. The fastener profiles 20 of the registered fastener strips are interlocked by squeezing them together as by means of rotary pinch rolls 45 located downstream adjacent to the folder 42. These pinch rolls 45 may be driven for advancing the web and zipper assembly through the apparatus.

After the dual bag ribbons 35 leave the rollers 45, they may, as shown in FIG. 1, be guided over rotary guide roller means 46 to a rotatably driven winding reel 47 where the multibag ribbons are wound into storage rolls 48 from which the ribbons may be supplied to a bag filling apparatus of any preferred type and wherein both of the bag folds of each of the ribbons 35 may be transversely sealed to provide bag sections and the bag sections separated as schematically indicated in FIGS. 3 and 4 from one another as by slitting along lines 49 between the separable and reclosable top closures.

Although in FIGS. 2–4, the fastener strips 15 have been shown as of the kind disclosed for example in U.S. Pat. No. 3,948,705, any other preferred fastener strip construction, often referred to as a zipper, may be embodied in the reclosable fastener, such, for example, as that shown in FIG. 5 where the zipper strips 15' instead of having the identical complementary rib and groove structure 20, 21, of the strips 15, have a combination of profiles. Thus, at the side of the zipper which is at the inside of the bag a generally arrow head cross-section profile element 50 on one of the strips 15' is interlockable with complementary generally hook-shaped profiles 51 and 52 on the other of the strips 15', and outwardly adjacent thereto and cooperative therewith a pair of complementary generally hook-shaped profiles 53 and 54 are interlockably interengageable and a stabilizing profile flange 55 cooperates therewith. This arrangement is particularly advantageous for providing a zipper that is more resistance to separating pressures from the inside of the bag than from the outside of the bag.

It may be observed that upon separation of the dual bag portions of the ribbons 35, pull flanges 57 and 58 are provided outwardly from the zipper to facilitate opening of the bags into which the material may be converted.

Although the disclosure has been directed, by way of example, to producing a pair of dual bag ribbons 35, a larger number of such dual bag ribbons may be provided for if desired. This merely requires a proportionate widening of the web W and addition of the appropriate number of fastener strips 15 needed for each additional multibag ribbon 35.

It will be understood that variations and modifications may be effected without departing from the spirit and scope of the novel concepts of the present invention.

I claim as my invention:

1. A method of making reclosable bag material, comprising:
    continuously running a continuous length of preformed flat bag wall web of multibag width spread out to its full width along flat stationary supporting surface means;
    joining into corunning assembled relation with the web on the surface means a plurality of continuous length spaced parallel preformed extruded resiliently flexible fastener profile strips, and in the assembly engaging base surfaces on said strips in face-to-face relation with the web;
    both of said web and said fastener profile strips being in a fully set condition so that in said joining they will not of themselves bond together;
    guiding the strips to retain their longitudinal running positions on the web; and
    applying bonding fusion energy by way of opening means in said surface means and through said web toward the base surface of each of said strips and thereby simultaneously bonding all of said strips to said web in the continuous running of the assembled web and strips.

2. A method according to claim 1, which comprises applying bond assuring pressure to said strips downstream from the applying of bonding fusion energy.

3. A method according to claim 1, which comprises effecting said guiding of the strips by running the strips in engagement with the web through a plurality of grooved rotary guiding and pressing roller means.

4. A method according to claim 3, which comprises maintaining the web taut at said opening means by engaging the web against said supporting surface means by pressure of certain of said roller means.

5. A method according to claim 1, which comprises maintaining said web taut in the vicinity of said opening means, and maintaining said base surfaces of the fastener profile strips biased toward said web, while applying said bonding fusion energy.

6. A method according to claim 1, which comprises extruding said fastener profile strips, chilling said fastener profile strips, supplying said web from a preformed supply of said web, and joining said web and said chilled profile strips upstream adjacent to said supporting surface means.

7. A method according to claim 1, which comprises separating the web and the strips bonded thereto into a plurality of multibag ribbons, and folding the ribbons upon themselves and interlocking complementary fastener strips and thereby providing dual bag sections on each of the folded ribbons.

8. A method according to claim 7, which comprises winding the folded dual bag ribbons into storage rolls.

9. Apparatus for making reclosable bag material, comprising:
    stationary flat supporting surface means;
    means for effecting continuous running of a continuous length of preformed fully set flat bag wall web of multibag web width spread out to its full width along said supporting surface means;
    means for joining into corunning assembled relation with the web on said surface means a plurality of continuous lengths of spaced parallel preformed extruded fully set resiliently flexible fastener profile strips, and for in the assembly engaging base surfaces on said strips in face-to-face relation with the web, but because of their fully set condition, the web and strips will not of themselves bond together;
    means for guiding the strips to retain their longitudinal running positions on the web;
    and means for applying bonding fusion energy through opening means in said surface means and through said web toward the base surface of each of said strips and thereby simultaneously bonding all of said strips to said web in the continuous running of the assembly.

10. Apparatus according to claim 9, including means for applying bond assuring pressure to said strips downstream from said means for applying bonding fusion energy.

11. Apparatus according to claim 9, wherein said means for guiding comprise grooved rotary guiding and pressing roller means.

12. Apparatus according to claim 11, wherein said roller means maintain the web taut at said opening means by engaging the web against said supporting surface means.

13. Apparatus according to claim 9, comprising means for maintaining said web taut in the vicinity of said opening means and for maintaining said base surfaces of the fastener profile strips biased toward said web in cooperation with said means for applying bonding fusion energy.

14. Apparatus according to claim 9, including means for extruding said fastener profile strips, means for chilling said fastener profile strips, means for supplying said web from a preformed supply of said web, and means for joining said web and said chilled profile strips upstream adjacent to said supporting surface means.

15. Apparatus according to claim 9, comprising means for separating the web and the strips bonded thereto into a plurality of multibag ribbons, and means for folding the ribbons upon themselves and interlocking the complementary fastener strips and thereby providing dual bag sections on each of the folded ribbons.

16. Apparatus according to claim 15, including means for winding the folded dual bag ribbons into storage rolls.

17. Apparatus according to claim 9, wherein said supporting surface means comprises a table having said opening means therein.

18. Apparatus according to claim 17, wherein said opening means are located at an intermediate position along the length of said table, said means for guiding the strips comprising a grooved roller at an upstream location over said table, a grooved roller at a downstream location over said table, and a grooved roller located in alignment over said opening means.

19. Apparatus according to claim 9, wherein said means for applying bonding fusion energy comprises hot air nozzles, and means for supplying the nozzles with hot air.

20. Apparatus according to claim 9, wherein said means for applying bonding fusion energy comprises rollers.

* * * * *